United States Patent Office 3,268,613
Patented August 23, 1966

3,268,613
STABILIZATION OF POLAR SILVER SALT HYDROCARBON EXTRACTING SOLUTIONS
Shigeto Suzuki, San Francisco, Calif., assignor to Chevron Research Company, San Francisco, Calif., a corporation of Delaware
No Drawing. Filed July 30, 1965, Ser. No. 476,147
3 Claims. (Cl. 260—681.5)

This invention relates to a method for the recovery of alkadienes. More particularly, it relates to the use of silver salt solutions for the recovery of $C_4$-$C_{12}$ alkadienes when present as a minor component in normally liquid mono-olefinic hydrocarbons. Still more particularly, it relates to a method of stabilizing solutions of reducible silver salts in polar media.

Frequently mono-olefinic hydrocarbons contain alkadienes as a minor component thereof. The relative amount of the diene depends upon the source and method of production of the mono-olefinic hydrocarbon material. For example, such materials as produced in the thermal cracking of paraffinic hydrocarbons may contain as much as 5–10% of alkadienes. Alkadienes having 4 to 12 carbon atoms, in general, are recoverable; they may be of the 1,3-conjugated variety, of the $\alpha,\omega$-diene type, or a combination of internal and terminal unsaturations. In any event these difunctional hydrocarbons are of value and useful in the chemical arts, provided of course that they can be separated from their mixtures with mono-olefins. In general conventional means of separation such as distillation, crystallization and the like are ineffective. Separations of olefins from hydrocarbon mixtures in which silver salt solutions are used are known. In general these processes suffer from an inherent instability of silver salt solutions in the presence of easily oxidizable organic matter, an effect which materially detracts from the utility of silver salt extractions.

It has now been found that silver salts dissolved in polar media and containing easily oxidizable organic matter can be stabilized by maintaining a substantially saturation concentration of molecular oxygen in the solution, and that by the use of this technique $C_4$-$C_{12}$ alkadienes in particular can be extractively removed from their mixtures with normally fluid alkene hydrocarbons by the use of silver salt solutions. When the beforedescribed oxygen concentration is not maintained, silver salt degradation can be extensively leading to loss in extraction activity and the deposition of solid silver-containing precipitates in the process transfer lines and vessels.

In a preferred embodiment of this invention a fluid $C_4$-$C_{12}$ alkene hydrocarbon fraction obtained from the thermal cracking of petroleum derived paraffinic wax containing about 5 weight percent of alkadienes is introduced into a stirred vessel togethed with about an equal volume of a concentrated aqueous silver nitrate solution, i.e., an approximately saturated solution. The contacting temperature is preferably below about 30° C. During the contacting and oxygen saturation concentration should be maintained in the aqueous silver salt solution. After about a 5–10 minute agitation period, the stirred content of the vessel is transferred to a second vessel fitted for basal withdrawal of the separated silver nitrate solution and a second exit port above the liquid interphase boundary through which is withdrawn the alkadiene-reduced mono-olefinic hydrocarbon for further use as desired.

The withdrawn silver nitrate solution is then passed into a third vessel fitted with a suitable heating means, preferably an indirect heat exchanger, and fitted with a basal gas feed line for the introduction into the liquid body of an air stream at a rate sufficient to maintain an approximate saturation concentration of oxygen in the silver salt solution. Through the foregoing line air is passed into the solution while the solution is heated to a temperature of about 95–98° C. Butadiene and the other low boiling alkadienes are recovered by condensation from the off-gas stream issuing from the heating vessel or zone and the higher boiling alkadienes concentrate as an upper liquid phase in the heating vessel and may be withdrawn through a suitable port as desired. The diene-depleted, oxygen-stabilized silver salt solution is withdrawn and recycled as desired. Generally a small portion of the recycle stream is diverted and silver values recovered in a manner known in the art in order to prevent build up of undesirable impurities.

While the preferred silver salt is silver nitrate and the preferred polar solvent is water, other salts and media may be used so long as the salt is a soluble silver salt and the medium is an ordinary organic solvent capable of dissolving at least about 5 weight percent of silver salt, based upon solvent. Both the salt and media desirably are relatively chemically inert, by which is meant that no appreciable chemical interaction occurs between them and 1-octene under the present process conditions.

Representative useful silver salts are in general conventional water soluble salts such as silver nitrate, fluoborate, fluosilicate, fluoride, and the like, as well as mixtures thereof. A solubility of at least 5 grams per 100 grams of solvent is desirable.

Representative inert polar media are water, alcohols, nitriles, glycols, amides and the like, for example as illustrated by such representative compounds as acetonitrile, dimethyl acetamide, propionitrile, ethanol, ethylene glycol, propanediol, glycerol, dimethyl formamide, dimethyl sulfoxide, benzonitrile, and the like, as well as mixtures thereof, that is, ordinary organic solvents which are relatively inert as shown by the above noted test and having in general dielectric constants, at 25° C. above about 10.

By definition, by a minor component is meant one percent in mixture in an amount less than 50 percent by weight.

The amount of silver salt solution relative to the hydrocarbon feed varies depending upon the amount of alkadiene present in the feed. At least there should be sufficient solution to obtain separate raffinate and extract phases. Particularly usefully alkadiene recoveries are experienced where the equivalent ratio of alkadiene to silver cation in about 1 to 1. Higher and lower ratios may also be used.

The invention is further illustrated by the following examples.

Examples 1–4

In Table I, following, is listed the data obtained from a series of extractions in which silver salt solutions as indicated were used to remove and recover 1,7-octadiene present as a minor component in 1-octene. In each case a representative mixture in which the diene comprised about 10 percent by volume of the olefinic hydrocarbon mixture was used. After a vigorous intermixing of the two immiscible phases, i.e., silver salt solution and olefinic hydrocarbon mixture, the phases were separated an a $\beta$-value (see Table I, footnote 1) determined. A $\beta$-value indicates the efficiency of separation. A satisfactory and feasible separation is possible whenever a $\beta$-value of at least 10 is found.

TABLE I.—SEPARATION OF 1,7-OCTADIENE FROM 1-OCTENE BY EXTRACTION WITH SILVER SALT SOLUTIONS

| Run No. | Extraction Solvent | Silver Salt Used | Weight Percent Salt | Ratio of Hydrocarbon to Ext. Sol. | Approximate Vol. Percent Hydrocarbon Extracted | Raffinate | | Extract | | Minimum $\beta$[1] |
|---|---|---|---|---|---|---|---|---|---|---|
| | | | | | | 1-Octene | 1,7-Octa-diene | 1-Octene | 1,7-Octa-diene | |
| 1 | Water | AgBF$_4$ | 47 | 0.4 | 10 | 99.7 | 0.3 | 21.8 | 78.2 | 1,190 |
| 2 | do | AgNO$_3$ | 62 | 1 | 10 | 98.1 | 1.9 | 8.1 | 91.9 | 580 |
| 3 | CH$_3$CN | AgNO$_3$ | 67 | 1 | 10 | 98.0 | 2.0 | 49.2 | 50.8 | 50 |
| 4 | Ethylene Glycol | AgNO$_3$ | 27 | 1 | 20 | 99.0 | 1.0 | 58.7 | 41.3 | 70 |

[1] $\beta = \dfrac{\text{(Weight Percent 1,7-Octadiene in Extract)/(Weight Percent 1-Octene in Extract)}}{\text{(Weight Percent 1,7-Octadiene in Raffinate)/(Weight Percent 1-Octene in Raffinate)}}$

*Examples 5–37*

As in the foregoing examples $\beta$-values were determined using dodecene-1 and 1,11-dodecadiene mixtures as indicated in Table II, following.

1,7-octadiene from a mixture thereof with 1-octene. Upon heating the extract to about 100° C., darkening of the solution and formation of a grey precipitate (finely divided silver metal) was readily noted.

TABLE II.—EXTRACTION OF 1,11-DODECADIENE FROM 1-DODECENE

| Run No. | Solvent | Wt. Percent AgNO$_3$ | Hydrocarbon Used | Ratio of Solvent to Hydrocarbon | Vol. Percent Hydrocarbon Extracted | Beta[2] |
|---|---|---|---|---|---|---|
| 5 | Water | 62 | Mix. A[1] | 1 | <1 | 140 |
| 6 | Water | 62 | Mix. A[1] | 2 | <1 | 43 |
| 7 | CH$^3$CN | 0 | Mix. A[1] | 1 | [3] 30 | 2 |
| 8 | CH$^3$CN | 44 | Mix. A[1] | 1 | <1 | 9 |
| 9 | CH$^3$CN | 71 | Mix. A[1] | 1 | 5 | 64 |
| 10 | HOCH$_2$CH$_2$OH | 0 | Mix. A[1] | 1 | <1 | 1.0 |
| 11 | HOCH$_2$CH$_2$OH | 25 | Mix. A[1] | 1 | 7 | 77 |
| 12 | HOCH$_2$CH$_2$OH | 25 | Mix. A[1] | 2 | 7 | 112 |
| 13 | CH$^3$CHOHCH$_2$OH | 0 | Mix. A[1] | 1 | <1 | 1.3 |
| 14 | CH$^3$CHOHCH$_2$OH | 33 | Mix. A[1] | 1 | 15 | 15 |
| 15 | CH$^3$CHOHCH$_2$OH | 33 | Mix. A[1] | 2 | 19 | 15 |
| 16 | CH$^3$CHOHCH$_2$OH | 33 | 12-Raff | 1 | 10 | 11 |
| 17 | CH$^3$CHOHCH$_2$OH | 33 | 14-Raff | 1 | 6 | 12 |
| 18 | CH$^3$CHOHCH$_2$OH | 33 | Mix. C[4] | 4 | 50 | 11 |
| 19 | 80% Aq. PG[5] | 38 | Mix. A[1] | 1 | 5 | 41 |
| 20 | 80% Aq. PG[5] | 38 | Mix. A[1] | 2 | 7 | 51 |
| 21 | 80% Aq. PG[5] | 38 | Mix. A[1] | 4 | 10 | 37 |
| 22 | 80% Aq. PG[5] | 38 | Mix. B[6] | 4 | 6 | 32 |
| 23 | 60% Aq. PG[5] | 38 | Mix. A[1] | 1 | 2 | 110 |
| 24 | DEG[7] | 0 | Mix. B[6] | 1 | <1 | 1.5 |
| 25 | DEG[7] | 15 | Mix. B[6] | 1 | 1 | 4 |
| 26 | 75% Aq. DEG | 35 | Mix. B[6] | 1 | 1 | 13 |
| 27 | DMF[8] | 0 | Mix. A[1] | 1 | 10 | 1.4 |
| 28 | DMF[8] | 37 | Mix. A[1] | 1 | 7 | 11 |
| 29 | DMF[8] | 50 | Mix. A[1] | 1 | 9 | 18 |
| 30 | DMF[8] | 50 | 27-Raff | 1 | 5 | 22 |
| 31 | DMF[8] | 50 | 28-Raff | 1 | 4 | 26 |
| 32 | DMF[8] | 50 | 29-Raff | 1 | 3 | 17 |
| 33 | DMF[8] | 50 | Mix. C[4] | 4 | 50 | 21 |
| 34 | DMF[8] | 50 | Mix. C[4] | 4 | 50 | 19 |
| 35 | DMA[9] | 0 | Mix. A[1] | 1 | 15 | 1.1 |
| 36 | DMA[9] | 37 | Mix. A[1] | 1 | 4 | 9 |
| 37 | DMA[9] | 48 | Mix. A[1] | 1 | 5 | 11 |

[1] Composition (weight percent): n-dodecane, 2.0%; 1-dodecene, 85.1%; 2-dodecene, 3.8%; 1,11-dodecadiene 9.1%.
[2] $\dfrac{\text{(Weight percent 1,11-dodecadiene in extract)/(weight percent 1-dodecene in extract)}}{\text{(Weight percent 1,11-dodecadiene in raffinate)/(weight percent 1-dodecene in raffinate)}}$
[3] High mutual solubilities.
[4] Composition (weight percent): n-dodecane, 10.5%; 1-dodecene, 38.8%; 2-dodecene, 1.8%; 1,11-dodecadiene 49.0%.
[5] Propylene glycol.
[6] Composition (weight percent): n-dodecane, 3.5%; 1-dodecene, 85.5%; 2-dodecene, 3.8%; 1,11-dodecadiene, 7.2%.
[7] Diethylene glycol.
[8] Dimethyl formamide.
[9] N,N-dimethylacetamide.

RECOVERY OF DIOLEFIN

In order to effectively recover the diolefin from the extraction complex present in the polar silver salt solution, the latter is heated to a temperature above about 90° C. but below about 200° C., preferably below about 150° C. At these elevated temperatures, however, silver salt decomposition becomes a substantial problem varying in some degree, depending upon the presence of easily oxidizable organic impurities in the feed and the particular polar medium employed. The effect is a production of metallic silver and appreciable losses in extraction power for the agents. By maintaining the heated extraction saturated with molecular oxygen the foregoing destruction of the silver ion is greatly reduced, if not fully eliminated, as shown in the following experiment.

*Example 38*

A concentrated solution of silver nitrate in dimethylformamide was used to extract at about room temperature 1,7-octadiene from a mixture thereof with 1-octene. Upon heating the extract to about 100° C., darkening of the solution and formation of a grey precipitate (finely divided silver metal) was readily noted.

In a second run, during the heating of the extract as described above, air was slowly bubbled through the solution maintaining an essentially saturated solution of molecular oxygen therein. No appreciable precipitation or darkening of the solution was noted during the recovery of the diolefin.

*Example 39*

Cracked petroleum derived α-olefin fractions: (1) $C_6$–$C_7$, and (2) $C_7$–$C_9$ cuts, were extracted using equal volumes of 62 weight percent aqueous silver nitrate and the aforementioned olefinic hydrocarbon containing about 5 mol percent of diene. A single such extractive treatment almost completely removed the diene present.

*Example 40*

As in Example 39, $C_9$–$C_{11}$ cracked wax olefin feeds containing diene by-product were extracted except that 50 weight percent silver nitrate in dimethylformamide was used as the polar medium. Substantial separation without silver precipitation was observed.

The α,ω-diene recovered as in the foregoing process are particularly useful in chemical synthesis, as in the polymer field where they are used as crosslinking agents. Furthermore, they are difunctional and capable of being converted to other difunctional compounds by the usual chemical methods.

The above-described results have demonstrated that $C_4$-$C_{12}$ n-alkadienes can be effectively recovered from fluid hydrocarbon mixtures. Also demonstrated is the stabilization by dissolved oxygen of reducible silver salt solutions under the reduction conditions generated by contact with hydrocarbon mixtures at elevated temperatures.

I claim:

1. Process for the recovery of n-$C_4$-$C_{12}$ alkadienes present as a minor component in lower normally fluid mono-olefinic hydrocarbons which comprises extractively contacting in a mixing zone said liquid hydrocarbon with a concentrated solution of a soluble silver salt in a polar solvent at a contact temperature below about 30° C., passing the resulting mixture to a phase separation zone, and individually withdrawing therefrom the separated diene reduced hydrocarbon raffinate and the separated silver salt solution extract, passing and said salt solution to a heating zone where it is heated while maintaining said solution substantially saturated with oxygen to a temperature above about 50° C., but below about 150 C., withdrawing the resulting thermally released diolefinic hydrocarbon from said heating zone at a point above said salt solution, and withdrawing said heated oxygen-stabilized silver salt solution from said separation zone.

2. In a process in which an extractable hydrocarbon is removed from a fluid hydrocarbon mixture containing silver salt reducing impurities by contacting said mixture with a concentrated reducible silver salt solution in a polar solvent at a temperature below about 50° C., the improvement which comprises maintaining a substantially saturation concentration of oxygen in said silver salt solution during said contacting.

3. In a process in which an extractable hydrocarbon is removed from a fluid hydrocarbon mixture containing silver salt reducing impurities by contacting said mixture with a concentrated reducible silver salt solution in a polar solvent at a temperature below about 50° C. separating said polar silver salt solution and recovering the resulting extracted hydrocarbon by heating the separated solution to a temperature above 50° C. but below about 150° C., the improvement which comprises maintaining a substantially saturation concentration of oxygen in said silver salt solution during said heating.

References Cited by the Examiner

UNITED STATES PATENTS

| | | | |
|---|---|---|---|
| 2,913,505 | 11/1959 | Van Raay et al. | 260—677 |
| 3,007,981 | 11/1961 | Baker et al. | 260—677 |
| 3,125,611 | 3/1964 | Monroe | 260—677 |

FOREIGN PATENTS

| | | |
|---|---|---|
| 949,050 | 2/1964 | Great Britain. |

DELBERT E. GANTZ, *Primary Examiner.*

G. E. SCHMITKONS, *Assistant Examiner.*